(12) United States Patent
Aurongzeb et al.

(10) Patent No.: US 11,600,999 B2
(45) Date of Patent: Mar. 7, 2023

(54) DETACHABLE WIRELESS CHARGING CLIP

(71) Applicant: Dell Products L.P., Round Rock, TX (US)

(72) Inventors: Deeder M. Aurongzeb, Austin, TX (US); Christopher A. Torres, San Marcos, TX (US); Andrew Thomas Sultenfuss, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 233 days.

(21) Appl. No.: 17/155,804

(22) Filed: Jan. 22, 2021

(65) Prior Publication Data

US 2022/0239124 A1    Jul. 28, 2022

(51) Int. Cl.
| | |
|---|---|
| *H02J 7/00* | (2006.01) |
| *H02J 7/02* | (2016.01) |
| *G06F 1/16* | (2006.01) |
| *H02J 50/10* | (2016.01) |
| *H02J 50/90* | (2016.01) |
| *H02J 50/00* | (2016.01) |

(52) U.S. Cl.
CPC .......... *H02J 7/0042* (2013.01); *G06F 1/1632* (2013.01); *H02J 7/02* (2013.01); *H02J 50/005* (2020.01); *H02J 50/10* (2016.02); *H02J 50/90* (2016.02)

(58) Field of Classification Search
CPC .................................................... H02J 7/0042
USPC ........................................................ 320/108
See application file for complete search history.

(56) References Cited

U.S. PATENT DOCUMENTS

| | | | |
|---|---|---|---|
| 2014/0059264 A1* | 2/2014 | Sudak | G06F 1/1632 710/303 |
| 2020/0204003 A1* | 6/2020 | Lee | H02J 50/10 |

FOREIGN PATENT DOCUMENTS

| | | | | |
|---|---|---|---|---|
| CN | 202309108 U | * | 7/2012 | H02J 7/00 |

* cited by examiner

*Primary Examiner* — Edward Tso
*Assistant Examiner* — Ahmed H Omar
(74) *Attorney, Agent, or Firm* — McDermott Will & Emery LLP (57) ABSTRACT

A disclosed wireless charging clip for an information handling system includes a first surface comprising a charging coil, a ferrite sheet positioned below the first surface, mating elements to be coupled to respective mating elements of the information handling system when the charging clip is installed on the information handling system, charging circuitry configured supply inductive power to charge an auxiliary device when the device is placed on top of the first surface, and a connector through which input power is received from the information handling system when the charging clip is installed. The charging coil may include multiple graphene layers. The charging clip may include a second surface and a third surface including the connector through which input power is received from the information handling system. The mating elements may include magnets to align and hold the charging clip in position with respect to the information handling system.

17 Claims, 9 Drawing Sheets

DETACHABLE WIRELESS CHARGING CLIP

BACKGROUND

Field of the Disclosure

This disclosure relates generally to information handling systems and, more particularly, to a detachable wireless charging clip for charging auxiliary devices while the charging clip is installed on an information handling system.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as desktop computers, notebook computers, tablet computers, and 2-in-1 tablet-laptop combination computers, exhibit a wide variety of configurations available from multiple vendors and may include any of a wide variety of accessories. Examples of accessories for information handling systems include portable accessories, such as media players, personal data assistants, digital cameras, cellular phones, cordless phones, and smart phones. Typically, portable accessories are powered using a rechargeable battery and may include a display device. Increasingly, these portable accessories, or auxiliary devices, support wireless charging.

SUMMARY

In one aspect, a disclosed wireless charging clip for an information handling system includes a first surface comprising a charging coil, a ferrite sheet positioned below the first surface, one or more mating elements to be coupled to respective mating elements of the information handling system when the wireless charging clip is installed on the information handling system, charging circuitry configured supply inductive power to charge an auxiliary device when the auxiliary device is placed on top of the first surface, and a connector through which input power is received from the information handling system when the wireless charging clip is installed on the information handling system.

In another aspect, a disclosed system includes a computing device and a wireless charging clip for the computing device. The wireless charging clip includes a first surface comprising a charging coil, a ferrite sheet positioned below the first surface, one or more mating elements to be coupled to respective mating elements of the computing device when the wireless charging clip is installed on the computing device, charging circuitry configured supply inductive power to charge an auxiliary device when the auxiliary device is placed on top of the first surface, and a connector through which input power is received from the computing device when the wireless charging clip is installed on the computing device.

In any of the disclosed embodiments, the wireless charging clip may further include a second surface and a third surface including at least a portion of the connector through which input power is received from the information handling system. When the wireless charging clip is installed on the information handling system, the first surface may be positioned on a first side of a housing portion of the information handing system and may be in contact with the first side of the housing portion of the information handling system, the second surface may be positioned parallel to the first surface on a second side of the housing portion of the information handling system opposite the first side of the housing portion of the information handling system and may be in contact with the second side of the housing portion of the information handling system, and the third surface may be positioned perpendicular to and between the first surface and the second surface, where a first edge of the third surface is coupled to a first edge of the first surface and a second edge of the third surface parallel to the first edge of the third surface is coupled to a first edge of the second surface parallel to the first edge of the first surface.

In any of the disclosed embodiments, at least one of the first edge of the third surface or the second edge of the third surface may be coupled to an edge of the first or second surface using a respective hinge, and when the wireless charging clip is not installed on the information handling system, the third surface may be rotated about the one or more hinges such that the height of the wireless charging clip is reduced.

In any of the disclosed embodiments, the wireless charging clip may further include a second surface and a third surface including at least a portion of the connector through which input power is received from the information handling system. When the wireless charging clip is installed on the information handling system and is being used to charge the auxiliary device, the first surface may extend outward from a position at a bottom edge of a housing portion of the information handing system and away from the information handling system, the second surface may extend inward from the bottom edge of the housing portion of the information handling system and may be in contact with a bottom side of the housing portion underneath the information handling system, and the third surface may be positioned perpendicular to the first surface and to the second surface, where a first edge of the third surface is coupled to a first edge of the first surface and a second edge of the third surface parallel to the first edge of the third surface is coupled to a first edge of the second surface parallel to the first edge of the first surface.

In any of the disclosed embodiments, when the wireless charging clip is installed on the information handling system and is not being used to charge the auxiliary device, the second surface may extend inward from the bottom edge of the housing portion of the information handling system and may be in contact with the bottom side of the housing portion underneath the information handling system, and the first surface may extend inward from the bottom edge of the housing portion of the information handing system and may be positioned below and in contact with the second surface.

In any of the disclosed embodiments, the one or more mating elements may include one or more magnets that, when magnetically coupled to respective magnets on the information handling system, cause the wireless charging clip to be installed on the information handling system in a predetermined position with respect to the information handling system.

In any of the disclosed embodiments, the one or more mating elements may include one or more magnets that, when magnetically coupled to respective magnets on the information handling system, hold the wireless charging clip in place when installed on the information handling system.

In any of the disclosed embodiments, the one or more mating elements may include one or more physical alignment tabs to be inserted in respective recess elements of the information handling system when the wireless charging clip is installed on the information handling system.

In any of the disclosed embodiments, the charging coil may be screen-printed on the first surface.

In any of the disclosed embodiments, the charging coil may include multiple graphene layers.

In any of the disclosed embodiments, the auxiliary device may be a personal mobile device.

In another aspect, a disclosed method is for charging an auxiliary device. The method includes installing a detachable wireless charging clip on an information handling system, where the detachable wireless charging clip comprises a first surface including a charging coil, a ferrite sheet positioned below the first surface, and charging circuitry configured supply inductive power to charge the auxiliary device when the auxiliary device is placed on top of the first surface. The installing includes coupling an input power connector of the detachable wireless charging clip through which input power is to be received to an output power connector of the information handling system, supplying power to the detachable wireless charging clip through the output power connector of the information handling system and the input power connector of the detachable wireless charging clip, and placing the auxiliary device on top of the first surface.

In any of the disclosed embodiments, the installing may further include aligning one or more mating elements of the detachable wireless charging clip to respective mating elements of the information handling system, and coupling the one or more mating elements of the detachable wireless charging clip to the respective mating elements of the information handling system.

In any of the disclosed embodiments, the installing may include positioning the first surface of the detachable wireless charging clip in a stowed position with respect to the information handling system, and the method may further include, prior to placing the auxiliary device on top of the first surface, re-positioning the first surface of the detachable wireless charging clip in a charging position with respect to the information handling system.

In any of the disclosed embodiments, the method may further include, subsequent to placing the auxiliary device on top of the first surface, determining that the auxiliary device has been charged, and detaching the detachable wireless charging clip from the information handling system.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

The wireless charging market is expanding quickly. For example, computer accessories, cellular phones, smart phones, phone accessories such as wireless headphones and earphones, and other consumer electronic devices are increasingly powered in this fashion. Companion battery chargers for these devices extend their usefulness. However, large battery chargers, which typically have a higher capacity to supply power, may not be well suited for use with compact and/or ultra-thin accessory devices. Users often keep their smart phones turned on and nearby when working on their computers. Therefore, it may be desirable to be able to charge their smart phones using a charger that does not force integration into the computer itself, which could be costly, and does not interfere with the user's workflow.

As described in detail herein, a detachable wireless charging clip may be easy to use, transport, and install on a user's computer when needed without adding bulk or significantly increasing the height or thickness of the user's computer. For example, when installed on an information handing system, the detachable wireless charging clip may be used to charge a personal mobile device or another type of auxiliary device such as, but not limited to, a media player, a personal data assistant, a digital camera, a cellular phone, a cordless phone, a smart phone, or another type of cellular network device. In various embodiments, the detachable wireless charging clip may be C-shaped or may have a diving board shape, although other shapes are possible. In some embodiments, the detachable wireless charging clip may be foldable, when not installed or in use, to reduce its height for storage, packaging, or transporting. The detachable wireless charging clip may be installed, for example, at a front edge or side edge of a housing portion of an information handling system at which an output power connector of the system is available to be coupled to a corresponding input power connector of the detachable wireless charging clip and may be made of materials that conform to the shape of the housing portion edge for a snug fit when installed on the system. In some embodiments, the detachable wireless charging clip may include an ultra-thin wireless charging circuit and/or an optional USB-C power circuit. A charging coil of the detachable wireless charging clip may include a multi-layer graphene construction or another type of thin charging coil construction. In some embodiments, the detachable wireless charging clip may be installed such that the charging coil occupies a portion of a palm rest region on the information handling system. In some embodiments, the detachable wireless charging clip may be configured for bilateral charging such that it may be used to charge an auxiliary device placed on the charging clip or to charge an internal battery of an information handling system on which it is installed, at different times and under certain circumstances.

Particular embodiments are best understood by reference to FIGS. 1-8 wherein like numbers are used to indicate like and corresponding parts.

Figure 1:
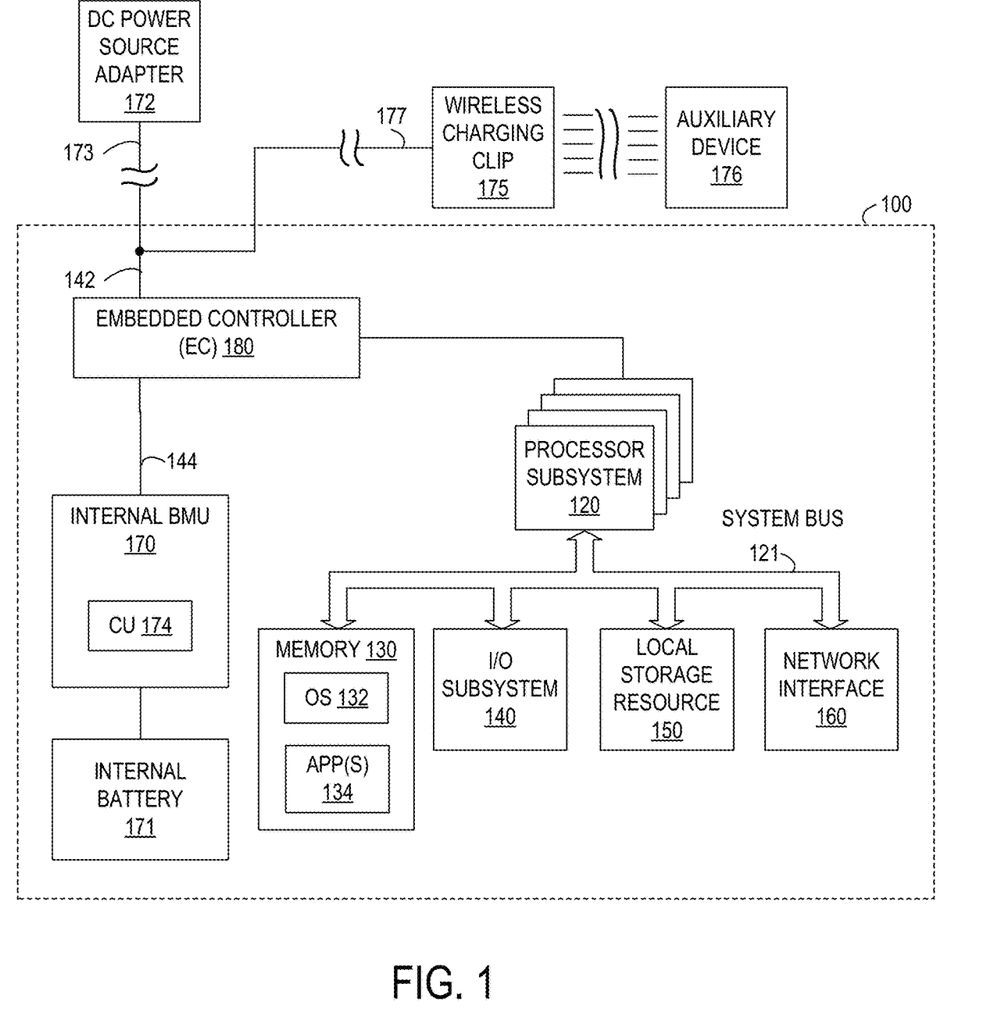
FIG. 1 is a block diagram illustrating selected elements of an embodiment of an information handling system.

Turning now to the drawings, FIG. 1 illustrates a block diagram depicting selected elements of an embodiment of information handling system 100. It is noted that FIG. 1 is not drawn to scale but is a schematic illustration. In various embodiments, information handling system 100 may represent different types of portable devices. A portable device may generally be any device that a user may carry for handheld use and that includes a processor. Typically, portable devices are powered using a rechargeable battery. Examples of portable information handling system 100 may include laptop computers, notebook computers, netbook computers, tablet computers, and 2-in-1 tablet laptop combination computers, among others. In some instances, information handling system 100 may represent certain personal mobile devices, and may further include examples such as media players, personal data assistants, digital cameras, cellular phones, cordless phones, smart phones, and other cellular network devices. In other instances, auxiliary device 176 may represent a personal mobile device.

As shown in FIG. 1, components of information handling system 100 may include, but are not limited to, a processor subsystem 120, which may comprise one or more processors, and a system bus 121 that communicatively couples various system components to processor subsystem 120 including, for example, a memory 130, an I/O subsystem 140, local storage resource 150, and a network interface 160. Also shown within information handling system 100 is embedded controller 180 and an internal battery management unit (BMU) 170 that manages an internal battery 171. Information handling system 100 is shown removably coupled to a DC power input 173 that may supply electrical power for operation of information handling system 100, including for charging internal battery 171, received from a DC power source through a direct current (DC) power source adapter 172. Information handling system 100 is also shown removably coupled to a detachable wireless charging clip 175 which may be used to charge an auxiliary device 176 when detachable wireless charging clip 175 is installed on information handling system 100. In at least some embodiments, detachable wireless charging clip 175 may be or include an inductive power source. In some embodiments, in addition to supplying inductive power to charge auxiliary device 176, detachable wireless charging clip 175 may supply inductive power for operation of information handling system 100, including for charging internal battery 171. Example embodiments of a detachable wireless charging clip are illustrated in FIGS. 2A-2C, 3, 5, 6A-6B and 7A-7B and described in detail below.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory 130). In the same or alternative embodiments, processor subsystem 120 may interpret and execute program instructions and process data stored remotely (e.g., in a network storage resource accessed through network interface 160).

In FIG. 1, system bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Also in FIG. 1, memory 130 may comprise a system, device, or apparatus operable to retain and retrieve program instructions and data for a period of time (e.g., computer-readable media). Memory 130 may comprise random access memory (RAM), electrically erasable programmable read-only memory (EEPROM), a PCMCIA card, flash memory, magnetic storage, opto-magnetic storage or a suitable selection or array of volatile or non-volatile memory that retains data after power is removed. In FIG. 1, memory 130 is shown including an operating system (OS) 132, which may represent an execution environment for information handling system 100, and one or more applications 134. Operating system 132 may be UNIX or be based on UNIX (e.g., a LINUX variant), one of a number of variants of Microsoft Windows® operating systems, a mobile device operating system (e.g., Google Android™ platform, Apple® iOS, among others), an Apple® MacOS operating system, an embedded operating system, a gaming operating system, or another suitable operating system.

In FIG. 1, local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data, and to permit access to stored instructions and data on demand.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as a touch panel, a display adapter, a keyboard, an accelerometer, a touch pad, a gyroscope, or a camera, among other examples. In some implementations, I/O subsystem 140 may support so-called 'plug and play' connectivity to external devices, in which the external devices may be added or removed while information handling system 100 is operating.

In particular embodiments, embedded controller 180 may support one or more power busses 142 that carry and distribute electrical power to and from information handling system 100. In some embodiments, power bus 142 may represent a data bus that also carries and distributes electrical power to and from information handling system 100. In one example, a DC power input 173 received from an external power source through a respective DC power source adapter 172 may be routed via a DC power connection 144 to internal BMU 170 for purposes of charging internal battery 171 or otherwise powering information handling system 100. In another example, when a detachable wireless charging clip 175 is installed on the information handling system, input power 177 may be supplied from information handling system 100 to the detachable wireless charging clip 175 over power bus 142 to allow detachable wireless charging clip 175 to charge auxiliary device 176.

In various embodiments, power bus 142 may represent a variable power bus that supports different levels of direct current (DC) power that may be provided to certain peripherals connected to I/O subsystem 140 and/or to wireless charging clip 175. In certain embodiments, a variable power bus may be implemented according to an industry standard, such as a USB Universal Serial Bus (USB), which is developed and supported by the USB Implementers Forum, Inc. (USB IF, www.usb.org). In particular, a variable power bus may be implemented as a USB Type-C bus that may support different USB devices, such as USB Type-C devices with USB Type-C connectors. In certain embodiments, power bus 142 may receive a DC power input 173 through a connector other than a USB type connector and/or may supply input power 177 to wireless charging clip 175 through a connector other than a USB type connector. For example, one or more of DC power source adapters 172 or wireless charging clip 175 may include a barrel-type connector, a Lightning™ connector developed by Apple, Inc., or a Thunderbolt™ connector developed by Apple, Inc., pogo pins, pads, or other connector types. In some embodiments, one or more external power sources may be electrically coupled to an information handling system using means other than a DC power source adapter.

Embedded controller (EC) 180 may include an EC processor as a second processor included within information handling system 100 for certain management tasks, including supporting communication and providing various functionality with respect to internal BMU 170. Thus, the EC processor may have access to an EC memory, which may store EC firmware representing instructions executable by the EC processor. In some embodiments, the EC firmware includes a power management function, which may represent executable code for managing DC power sources, as well as for controlling various operating parameters of internal battery 170. In some embodiments, the EC firmware may include pre-boot instructions executable by the EC processor. For example, the EC firmware may be operable to prepare information handling system 100 to boot by activating various hardware components in preparation of launching an operating system for execution. Accordingly, in some embodiments, EC firmware may include a basic input/output system (BIOS). In certain embodiments, EC firmware includes a Unified Extensible Firmware Interface (UEFI) according to a specification promulgated by the UEFI Forum (uefi.org). Embedded controller 180 may execute EC firmware on the EC processor even when other components in information handling system 100 are inoperable or are powered down. Furthermore, EC firmware may be in control of EC communication interface(s), which may represent one or more input/output interfaces or signals that embedded controller 180 can use to communicate with other elements of information handling system 100, such as processor subsystem 120 or I/O subsystem 140, among others.

In some embodiments, embedded controller 180 may be responsible for managing electrical power connections between internal or external power sources and other portions of information handling system 100 or connected devices, including wireless charging clip 175. In other embodiments, power control may be implemented by a separate power controller external to embedded controller 180. For example, power bus 142 may supply electrical power to information handling system 100, in which case embedded controller 180, or a separate power controller, may determine whether the electrical power is used to charge internal battery 171 or to directly power information handling system 100 and/or wireless charging clip 175 (if installed). In another example, embedded controller 180, or a separate power controller, may manage so-called 'soft start up' of information handling system 100, such as when information handling system 100 awakes from a low power state, such as sleep mode, by determining a source of power during the low power state and managing operation of information handling system 100 during the low power state. In the illustrated embodiment, DC power and control 144 may represent suitable connections between embedded controller 180 and internal BMU 170, for example. This may include connections for providing data obtained from internal battery 171 (e.g., temperature, battery state, state of charge, etc.), which may serve as inputs for power management within information handling system 100.

As illustrated in FIG. 1, information handling system 100 may include a battery management unit (BMU) 170 that controls operation of internal battery 171. In particular implementations, BMU 170 may be embedded within a respective battery whose operation BMU 170 controls. For example, internal BMU 170 within information handling system 100 may control operation of an internal battery 171. More specifically, BMU 170 may monitor information associated with, and control charging operations of, internal battery 171. In operation, BMU 170 may control operation of internal battery 171 to enable sustained operation, such as by protecting internal battery 171. Protection of internal battery 171 by BMU 170 may comprise preventing internal battery 171 from operating outside of safe operating conditions, which may be defined in terms of certain allowable voltage and current ranges over which internal battery 171 can be expected to operate without causing self-damage. For example, the BMU 170 may modify various parameters in order to prevent an over-current condition (whether in a charging or discharging mode), an over-voltage condition during charging, an under-voltage condition while discharging, or an over-temperature condition, among other potentially damaging conditions.

In various embodiments, internal battery 171 illustrated in FIG. 1 may include one or more cells having a particular chemistry in a particular cell configuration. For example, in one embodiment, internal battery 171 may include four Lithium-ion cells in a two parallel-two serial (2S-2P) configuration. In other embodiments, internal battery 171 may include a different number of cells or may include multiple cells in a different configuration. For example, internal battery 171 may include three or more cells in various configurations. In some embodiments, internal battery 171 may include one or more cells based on any one of a variety of Lithium-ion electrochemistries, or one or more cells based a different electrochemistry than Lithium-ion.

In FIG. 1, BMU 170 may include a charging unit (CU) 174 that may control charging cycles for internal battery 171 and may apply a "top-of-charge voltage" (or "TOC" voltage) as a threshold to determine when charging is complete as the battery voltage increases during charging. The TOC voltage may be lower than or equal to the maximum charge voltage that internal battery 171 can physically sustain, in different embodiments. Depending on the actual value for the TOC voltage, a given energy capacity may be stored using internal battery 171. BMU 170 may also be enabled to obtain various types of information associated with internal battery 171 and to make decisions according to the obtained information. For example, BMU 170 may monitor various charging-related parameters or other operating parameters received from one or more battery cells in internal battery 17, such as a charging current, a voltage, a battery impedance, and a temperature associated with internal battery 171. In some embodiments, at least some of the parameters monitored by BMU 170 may be used internally by BMU 170 for internal battery management operations. In some embodiments, at least some of the parameters monitored by BMU 170 may be provided to a power management function of embedded controller 180 to implement management of DC power sources, as well as for internal battery management.

As noted above, in some embodiments, a detachable wireless charging clip may be installed on an information handling system at an edge of a housing portion of the system. In embodiments in which the detachable wireless charging clip is C-shaped, it may be installed by sliding the charging clip onto the system such that a first surface of the charging clip is positioned above the housing portion, a second surface of the charging clip is positioned below the housing portion, and a third surface (i.e., the "spine") of the C-shaped charging clip is aligned with the system to allow an input power connector on the charging clip to be coupled to a corresponding output power connector on the system.

Figure 2A:
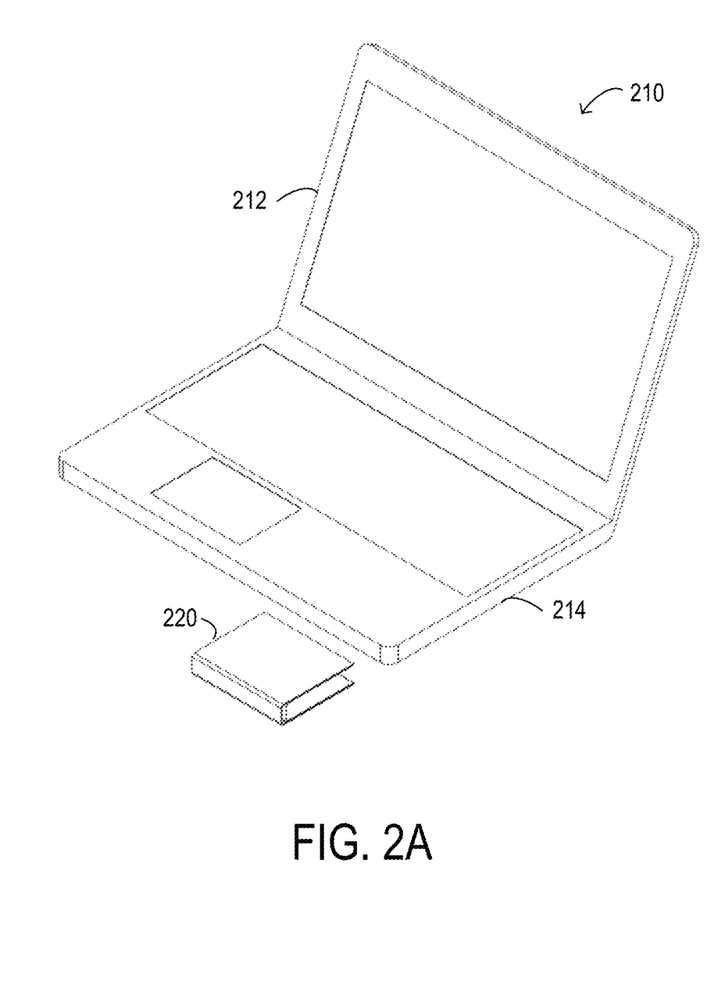
FIG. 2A illustrates selected elements of an embodiment of a system including a portable computing device and an uninstalled detachable wireless charging clip.

FIG. 2A illustrates selected elements of an embodiment of a system including a portable computing device 210 and an uninstalled C-shaped detachable wireless charging clip 220. In the illustrated embodiment, a portable information handling system 210 includes a base housing portion 214 rotationally coupled to a lid housing portion 212 via a hinge assembly such that a user may rotate the base housing portion 214 and/or the lid housing portion 212 relative to each other. The base housing portion 214 and lid housing portion 212 may, collectively, house one or more components of the portable information handling system, including but not limited to a processor subsystem 120, system bus 121, memory subsystem 130, I/O subsystem 140, local storage resource 150, network interface 160, embedded controller 180, internal BMU 170, and/or internal battery 171, as described above with respect to information handling system 100 illustrated in FIG. 1, and one or more peripherals, such as a touch panel, display, keyboard, and/or camera. In some embodiments, a keyboard may be housed in the base housing portion 214 and a display may be housed in the lid housing portion 212. When the information handling system is not in use, the lid housing portion 212 may be closed over the top of base housing portion 214 so that the display is protected from unintended use or damage.

Detachable wireless charging clip 220 may be similar to wireless charging clip 175 illustrated in FIG. 1. In some embodiments, detachable wireless charging clip 220 may be configured in accordance with a wireless power transfer standard, such as the Qi open interface standard developed by the Wireless Power Consortium, which defines wireless power transfer using inductive charging over distances of up to 4 cm (1.6 inches). In accordance with this standard, when the charging clip 220 is installed on the information handling system 210, an auxiliary device may be placed on top of the charging clip 220. When DC input power is supplied to the charging clip 220, e.g., by information handing system 210, an internal battery in the auxiliary device may be charged via resonant inductive coupling. Under the low-power Qi specification, a wireless power module may deliver up to 5 W (e.g., to charge and/or power mobile devices), while under the medium-power Qi specification, a wireless power module may deliver up to 120 W (e.g., to charge and/or power larger devices, such as displays and laptop computers).

In some cases, information handling system 210 may also be configured to receive inductive power transferred to the information handling system from detachable wireless charging clip 220. For example, in some embodiments, both the information handling system 210 and the detachable wireless charging clip 220 may be configured in accordance with a wireless power transfer standard, such as the Qi open interface standard for bilateral charging.

Figure 2B:
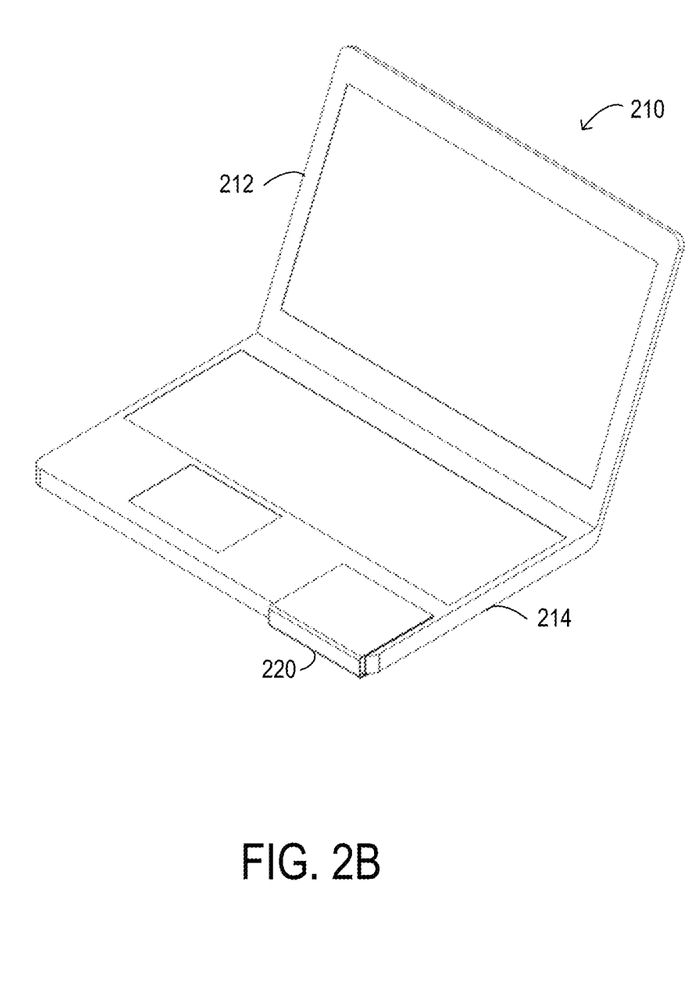
FIG. 2B illustrates selected elements of an embodiment of a system including a portable computing device and an installed detachable wireless charging clip.

FIG. 2B illustrates selected elements of the system illustrated in FIG. 2A including portable computing device 210 and installed detachable wireless charging clip 220. As illustrated in FIG. 2B, the C-shaped detachable wireless charging clip 220 may be installed over the front corner of the portable computing device 210 (e.g., in a palm rest region of base housing portion 214) by sliding the charging clip over the front edge of the base housing portion 214. Installing the charging clip may include aligning an input power connector of the detachable wireless charging clip 220 with a corresponding output power connector on the front edge of the base housing portion 214 (not shown in FIGS. 2A-2C) and coupling the connectors to each other for supplying power from information handling system 210 to detachable wireless charging clip 220. Once the detachable wireless charging clip 220 has been installed on portable computing device 210, an auxiliary device may be placed on top of portable computing device 210 for wireless charging.

Figure 2C:
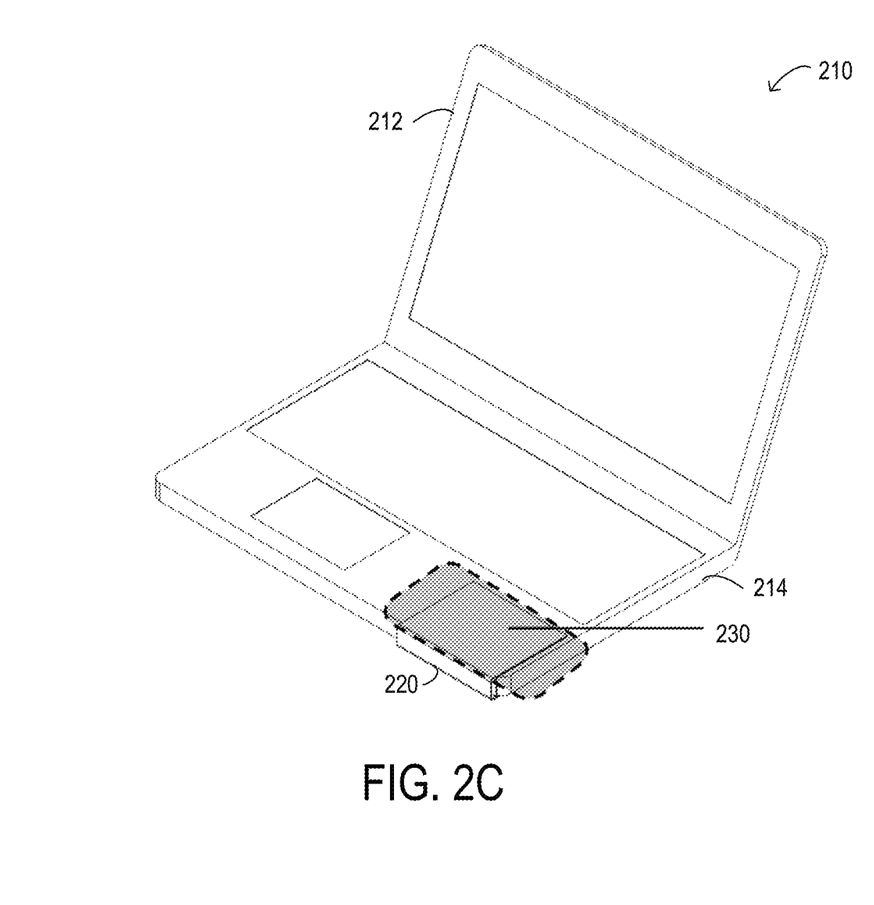
FIG. 2C illustrates selected elements of an embodiment of a system including a portable computing device and an installed detachable wireless charging clip that is being used to charge an auxiliary device.

FIG. 2C illustrates selected elements of an embodiment of the system illustrated in FIGS. 2A and 2B including portable computing device 210 and an installed detachable wireless charging clip 220 that is being used to charge an auxiliary device 230. In some embodiments, the auxiliary device 230 may be similar to auxiliary device 176 illustrated in FIG. 1. As illustrated in FIG. 2C, the C-shaped detachable wireless charging clip 220 is installed over the front corner of the portable computing device 210 and the auxiliary device 230, which may be a smart phone or other personal mobile device, has been placed on top of detachable wireless charging clip 220 for charging via resonant inductive coupling. Note that, while FIGS. 2A-2C illustrate an embodiment in which a C-shaped detachable wireless charging clip is installed at a front edge of a base housing portion of a portable computing device, in other embodiments, a C-shaped detachable wireless charging clip may be installed on a different side or in a different position on the base housing portion at which an input power connector on the charging clip can be coupled to a corresponding output power connector on the computing device. In still other embodiments, a C-shaped detachable wireless charging clip may be installed in any position and on any suitable housing portion of an information handling system at which an input power connector on the charging clip can be coupled to a corresponding output power connector on the information handling system.

In some cases, a user may, after installing a C-shaped detachable wireless charging clip such at that illustrated in FIGS. 2A-2C on an information handling system, elect to leave the detachable wireless charging clip installed permanently, for some period of time, or until and unless conditions warrant its removal, such as if it is to be replaced with another detachable wireless charging clip or other device. For example, if the installed detachable wireless charging clip does not interfere with the user's workflow, the user may refrain from detaching the charging clip between charging sessions. In other cases, a user may elect to detach the charging clip between at least some charging sessions. In some embodiments, when the C-shaped charging clip is detached from an information handling system on which it was previously installed, it may be folded or flattened to reduce its height for storage, packaging, or transporting. For example, in some embodiments, the front edge of the top surface of the charging clip may be coupled to the top edge of the front surface using a hinge and the top surface may be rotated about the hinge to form a triangular shape and reduce the height of the charging clip. In some embodiments, a second hinge may be used to couple the front edge of the bottom surface to the bottom edge of the front surface and the bottom surface may be rotated about the hinge to flatten the charging clip and further reduce its height.

Figure 3:
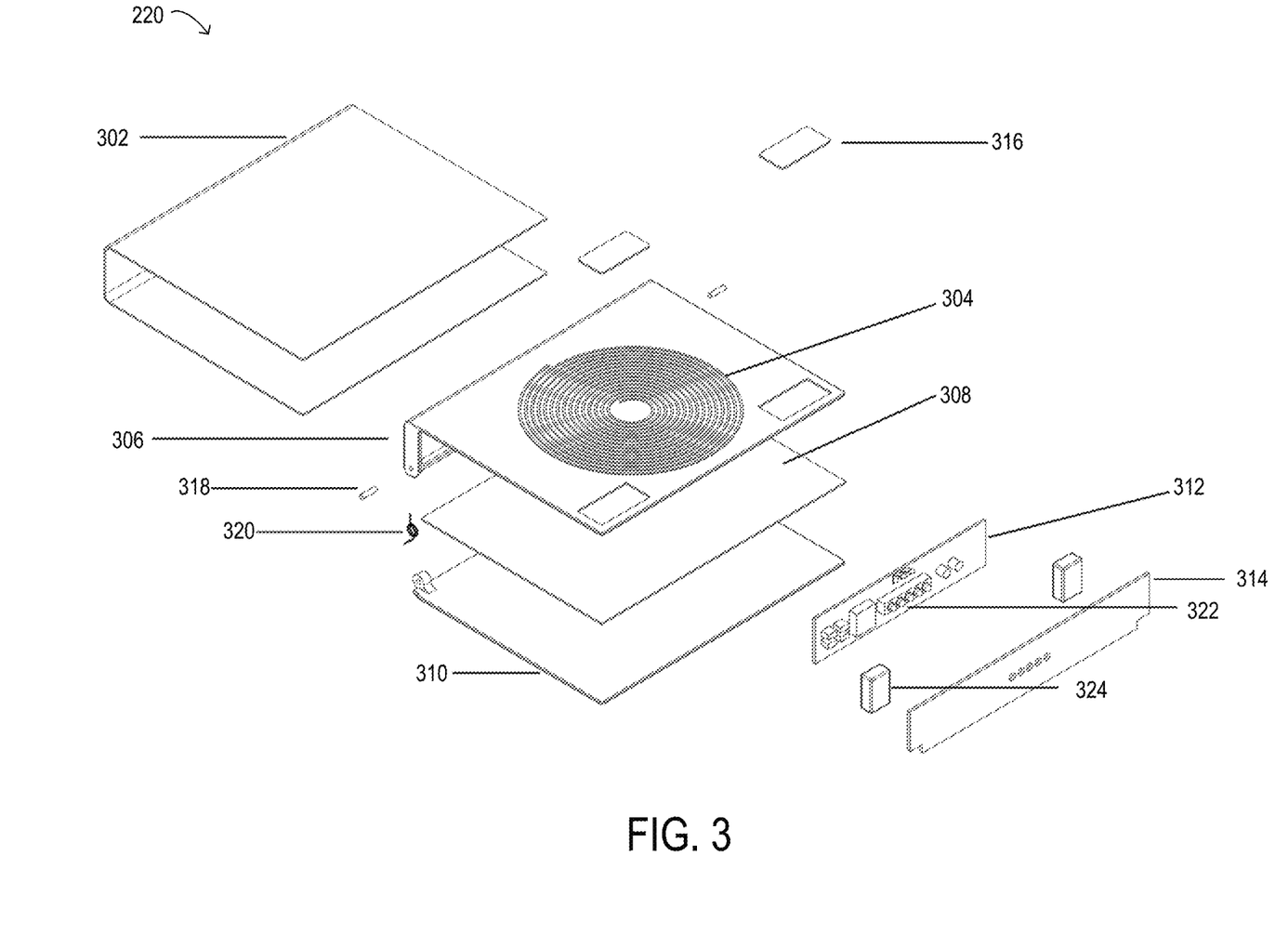
FIG. 3 is an exploded view diagram illustrating selected elements of a detachable wireless charging clip, according to some embodiments.

FIG. 3 is an exploded view diagram illustrating selected elements of a C-shaped detachable wireless charging clip 220, according to some embodiments. As illustrated in FIG. 3, charging clip 220 includes a cover 302. In some embodiments, cover 302 may be made from an elastomer, such as an elastomer having a high dielectric constant. In other embodiments, cover 302 may be made from a ceramic fiber or glass, a thermoplastic, a renewable material such as bamboo, a fabric, or in general, any material of suitable strength that does not react with the flux stream of the charging clip.

Charging clip 220 also includes a first surface 306 (which may be referred to as the "top" surface) including an embedded charging coil 304, and a second surface 310 (which may be referred to as the "bottom" surface). In some embodiments, the charging coil may be screen-printed (e.g., 3D printed) on surface 306. In some embodiments, the charging coil may be constructed using multiple graphene layers. Charging clip 220 also includes a ferrite sheet 308, which focuses the flux beam during wireless charging.

Charging clip 220 includes a charging printed circuit board assembly (PCBA) 312 which is positioned on the inside of the "spine" of charging clip 220 and including circuitry for charging a device placed on the charging clip. PCBA 312 is attached to surface 306, which includes charging coil 304. For example, in at least some embodiments, there are contacts on the underside of surface 306 that interface with the charging PCBA 312. PCBA 312 includes an input power connector 322 to be coupled to a corresponding output power connector on the information handling system into which charging clip 220 is installed. In some embodiments, input power connector 322 may include pogo pins or pads. In general, input power connector 322 may include any type of plug or receptable connector arrangement, in different embodiments. When charging clip 220 is installed on the information handling system, the charging circuitry receives power from the system through input power connector 322. An inner cover 314 overs PCBA 312 on the side of the "spine" of charging clip 220 facing the information handling system.

In some embodiments, charging clip 220, or PCBA 312, may include a power conversion unit and an embedded power controller (not shown in FIG. 3). In some embodiments, the embedded power controller may be coupled to the power conversion unit and may implement communication and control functionality for charging clip 220. In some embodiments, coil 304 may include multiple coils. The power conversion unit may be coupled to coil 304. In at least some embodiments, coil 304 may provide and/or transmit one or more magnetic fields. For example, one or more magnetic fields may be powered via the power conversion unit. In one or more embodiments, the power conversion unit and coil 304 may form and/or implement a wireless power transmitter that may transmit power via one or more magnetic fields. For example, coil 304 may be a primary or transmitting coil that generates an oscillating magnetic field.

In the embodiment illustrated in FIG. 3, the detachable charging clip 220 includes multiple ferrous plates 316 to magnetically couple surface 306 to corresponding ferrous plates on the information handling system when installed. Ferrous plates 316 serve to align and position charging clip 220 in the desired position with respect to the information handling system and to hold surface 306 snug and flat against the housing portion of the system (e.g., a palm rest region) where it is installed. Additional magnets 324 provide both a holding force and an alignment of the "spine" of charging clip 220, along with PCBA 312 and inner cover 314, with respect to the side of the base housing portion of the system on which charging clip 220 is installed. For example, magnets 324 may be magnetically coupled to corresponding magnets on the front or side of the base housing portion of the system to align and position input power connector 322 with a corresponding output power connector of the system when charging clip 220 is installed in the system.

In the illustrated embodiment, charging clip 220 is constructed using a spring-loaded sandwich type construction to support some flexibility in the thickness of the base housing portion of the information handling systems into which charging clip 200 can be installed. For example, charging clip 220 includes a hinge pin 318 and a torsion spring 320 that allow the charging clip to conform to multiple types and models of information handling systems.

In one or more embodiments, a pickup power unit and coil of an auxiliary device that is charged by charging clip 220 may form and/or implement a wireless power receiver that receives power via one or more magnetic fields. For example, a coil of the auxiliary device may be a secondary or receiving coil. The magnetic field transmitted by coil 304 may induce an alternating current in the coil of the auxiliary device by Faraday's law of induction. Close spacing of the two coils, as well as shielding on their surfaces, may ensure the inductive power transfer is efficient. For example, these coils may typically be on the order of 5 mm apart. However, the coils may be up to 40 mm apart, and possibly farther apart, in some embodiments. In some embodiments, the coil of the auxiliary device may be coupled to the power pickup unit, and the power pickup unit may provide power to other components of the auxiliary device for operation or for charging its internal battery. In some embodiments, the coil of the auxiliary device may capture and/or receive one or more magnetic fields and may provide voltage and current from the one or more magnetic fields to the power pickup unit. In some embodiments, the power pickup unit may provide regulated voltage and/or current to other device components. In some embodiments, regulation of the output voltage may be provided by a digital control loop in which the receiver of the inductive power (in this case, the auxiliary device) communicates with the transmitter of the inductive power (in this case, charging clip 220) and requests more or less power. Communication may be unidirectional from the power receiver to the power transmitter using, for example, backscatter modulation.

Figure 4A:
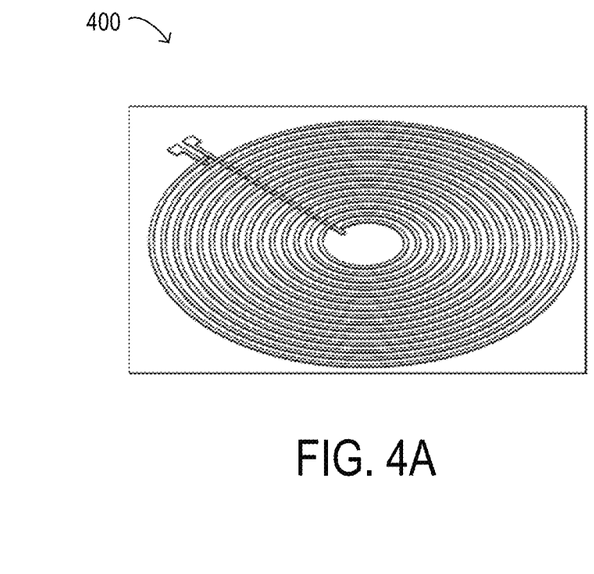
FIG. 4A illustrates an alternate construction for the charging coil shown in FIG. 3, according to some embodiments.

While the charging clip illustrated in FIG. 3 is described as including a multi-layer graphene coil, in other embodiments, a detachable wireless charging clip may include a different type of charging coil, such as a Litz wire coil, a flexible printed circuit (FPC) coil, or another type of traditional charging coil. FIG. 4A illustrates an alternate construction for the charging coil shown in FIG. 3, according to some embodiments. In this example, charging coil 400 is constructed using a Litz wire coil.

Figure 4B:
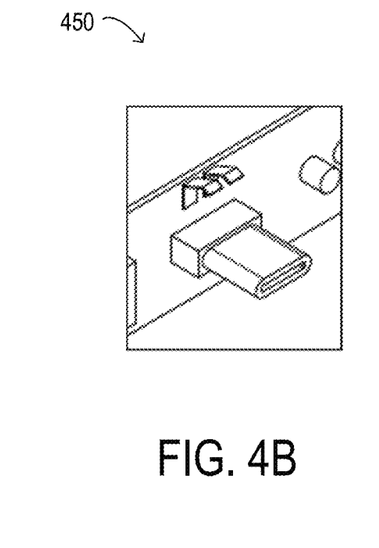
FIG. 4B illustrates an alternate connector for receiving input power from an information handling system, according to some embodiments.

FIG. 4B illustrates an alternate connector for receiving input power from an information handling system, according to some embodiments. In this example, input power connector 450 is or includes a USB Type-C connector.

Figure 5:
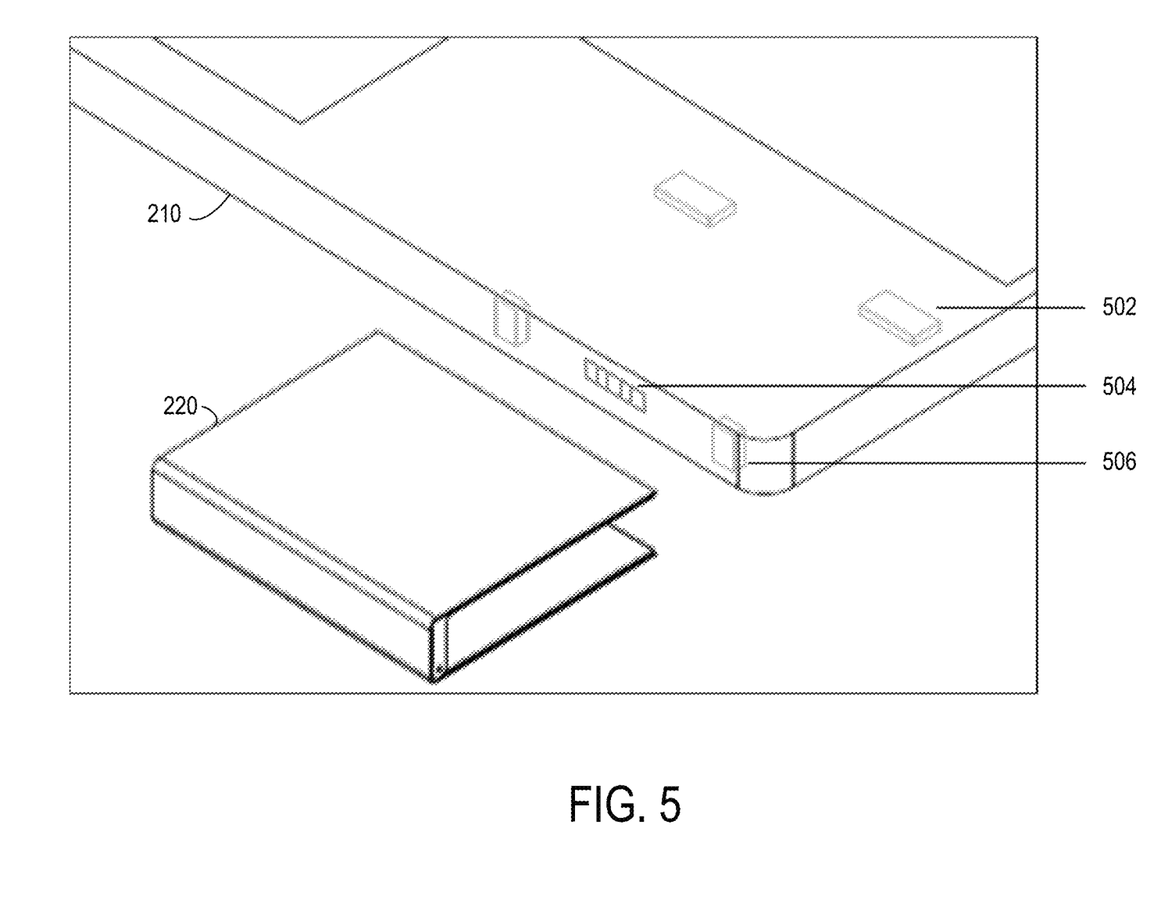
FIG. 5 illustrates example positions for holding force magnets and alignment magnets on an information handling system onto which a detachable charging clip is to be installed, according to some embodiments.

FIG. 5 illustrates example positions for holding force and alignment magnets on an information handling system onto which a C-shaped detachable charging clip 220 is to be installed. In the illustrated embodiment, portable computing device 210 is shown including multiple magnets 502 in a palm rest region of the base housing portion of computing device 210. When the charging clip is installed in portable computing device 210, magnets 502 may be magnetically coupled to ferrous plates 316 shown in FIG. 3, which serve to align and position charging clip 220 in the desired position with respect to the information handling system and to hold surface 306 snug and flat against the palm rest region of the base housing portion of computing device 210. Portable computing device 210 also includes multiple magnets 506 on the front edge of the base housing portion of portable computing device 210. Magnets 506 may be magnetically coupled to magnets 324 shown in FIG. 3, which provide both a holding force and an alignment of the "spine" of charging clip 220, along with PCBA 312 and inner cover 314, with respect to the front side of the base housing portion of the system on which charging clip 220 is installed. In this example, magnets 324 serve to align and position input power connector 322 with a corresponding output power connector 504 on the front edge of portable computing device 210 when charging clip 220 is installed in the system.

While several example embodiments illustrated in the figures and described above include a C-shaped detachable wireless charging clip for installation on an edge of a base housing portion of a portable computing device, in other embodiments, a C-shaped detachable wireless charging clip may be installed in an information handling system having a different footprint and/or configuration. For example, a C-shaped detachable wireless charging clip may be installed on an edge of a desktop computer, a tablet device, a monitor or monitor stand, a dock or dock extension, a 2-in-1 tablet-laptop combination, or an all-in-one computer. In still other embodiments, a detachable wireless charging clip may have a shape other than a C-shape such as, for example, a diving board shape. A charging surface of a detachable wireless charging clip that has a diving board shape may be largely tucked under the information handling system on which it is installed when not in use and may be rotated about a hinged edge and repositioned to extend outward from the information handling system so that an auxiliary device can be placed on the charging surface for wireless charging.

Figure 6A:
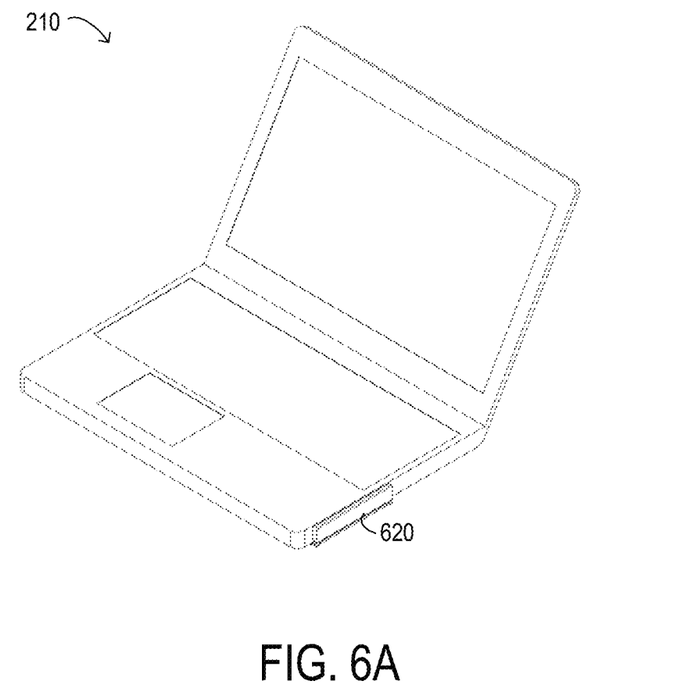
FIG. 6A illustrates an alternate embodiment of a detachable wireless charging clip in a stowed position.
Figure 6B:
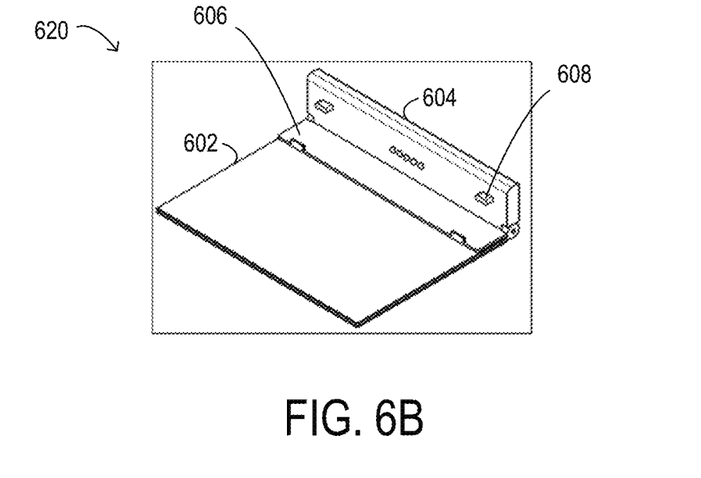
FIG. 6B illustrates the relative positions of selected elements of the detachable wireless charging clip shown in FIG. 6A while in the stowed position.

FIG. 6A illustrates an alternate embodiment of a detachable wireless charging clip 620 having a diving board shape while installed in portable computing device 210 and in a stowed position and FIG. 6B illustrates the relative positions of selected elements of the detachable wireless charging clip 620 shown in FIG. 6A while the charging clip is installed in portable computing device 210 and in the stowed position. In the illustrated embodiment, detachable wireless charging clip 620 includes a charging surface 602 which may be similar to surface 306 illustrated in FIG. 3 and include a charging coil similar to charging coil 304. While the charging clip 620 is in the stowed position, charging surface 602 is positioned underneath portable computing device 210 with its charging coil side facing down toward the surface on which portable computing device 210 is sitting. Charging clip 620 also includes a connector portion 604 including an input power connector which is coupled to a corresponding output power connector of portable computing device 210 (not shown) when the charging clip is installed on portable computing device 210. One edge of charging surface 602 may be coupled to the bottom edge of connector portion 604 using a hinge (not shown). Charging clip 620 also includes an extension portion 606 which, while the charging clip is in the stowed position, is positioned above charging surface 602 and underneath portable computing device 210.

In the illustrated embodiment, detachable wireless charging clip 620 includes two mating elements, shown as physical alignment tabs 608, which may be used for aligning and positioning charging clip 620 and its input power connector to the desired position on the edge of portable computing device 210, i.e., the position in which the input power connector can be coupled to the corresponding output power connector when charging clip 620 is installed. In some embodiments, one or more magnets may provide a holding force and/or may provide alignment of these elements instead of, or in addition to, physical alignment tabs 608. In the illustrated embodiment, when the user wants to charge an auxiliary device, the charging surface 602 may be rotated about the hinged edge between the charging surface 602 and the connector portion 604 such that the charging surface 602 is repositioned to extend outward from the information handling system and flat against the surface on which portable computing device 210 is sitting with the charging coil side facing up. When charging clip 620 is in this charging (or working) position, an auxiliary device can be placed on the charging surface for wireless charging, as described herein.

Figure 7A:
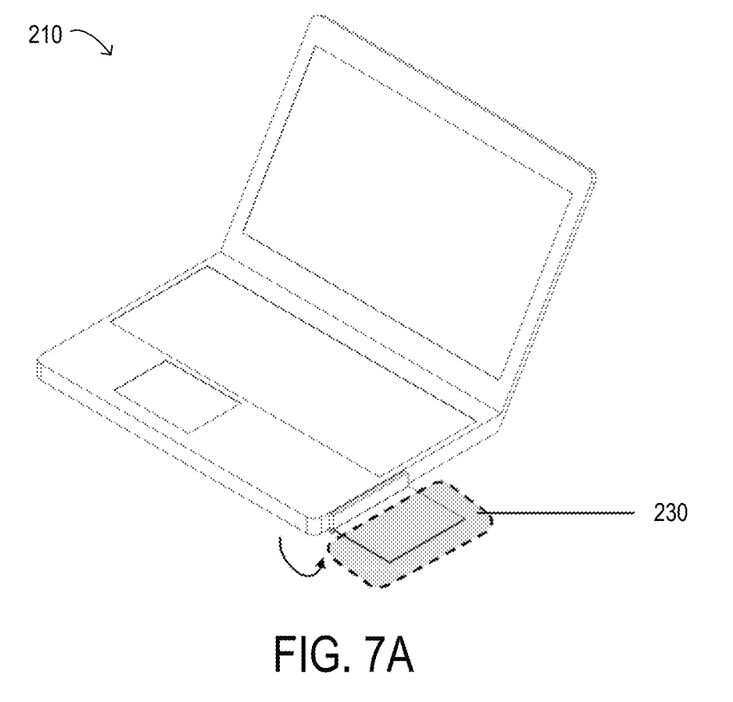
FIG. 7A illustrates the detachable wireless charging clip shown in FIG. 6A in a working or charging position.
Figure 7B:
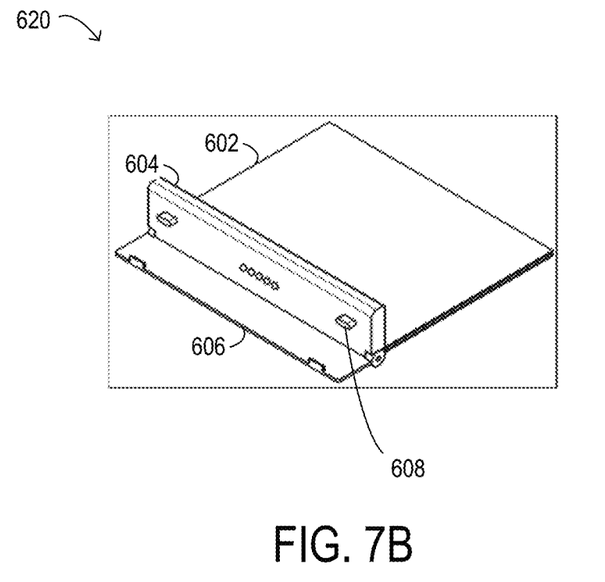
FIG. 7B illustrates the relative positions of selected elements of the detachable wireless charging clip shown in FIG. 6A while in the working or charging position.

FIG. 7A illustrates the detachable wireless charging clip 620 shown in FIG. 6A in the charging (or working) position and FIG. 7B illustrates the relative positions of selected elements of the detachable wireless charging clip shown in FIG. 6A while in the charging (or working) position. While the charging clip 620 is in this position, charging surface 602 extends outward from the information handling system and lies flat against the surface on which portable computing device 210 is sitting with the charging coil side facing up. When charging clip 620 is in this charging (or working) position, an auxiliary device 230 can be placed on the charging surface for wireless charging, as shown and described herein. While the charging clip is in the charging (or working) position, the extension portion 606 remains positioned underneath portable computing device 210.

Figure 8:
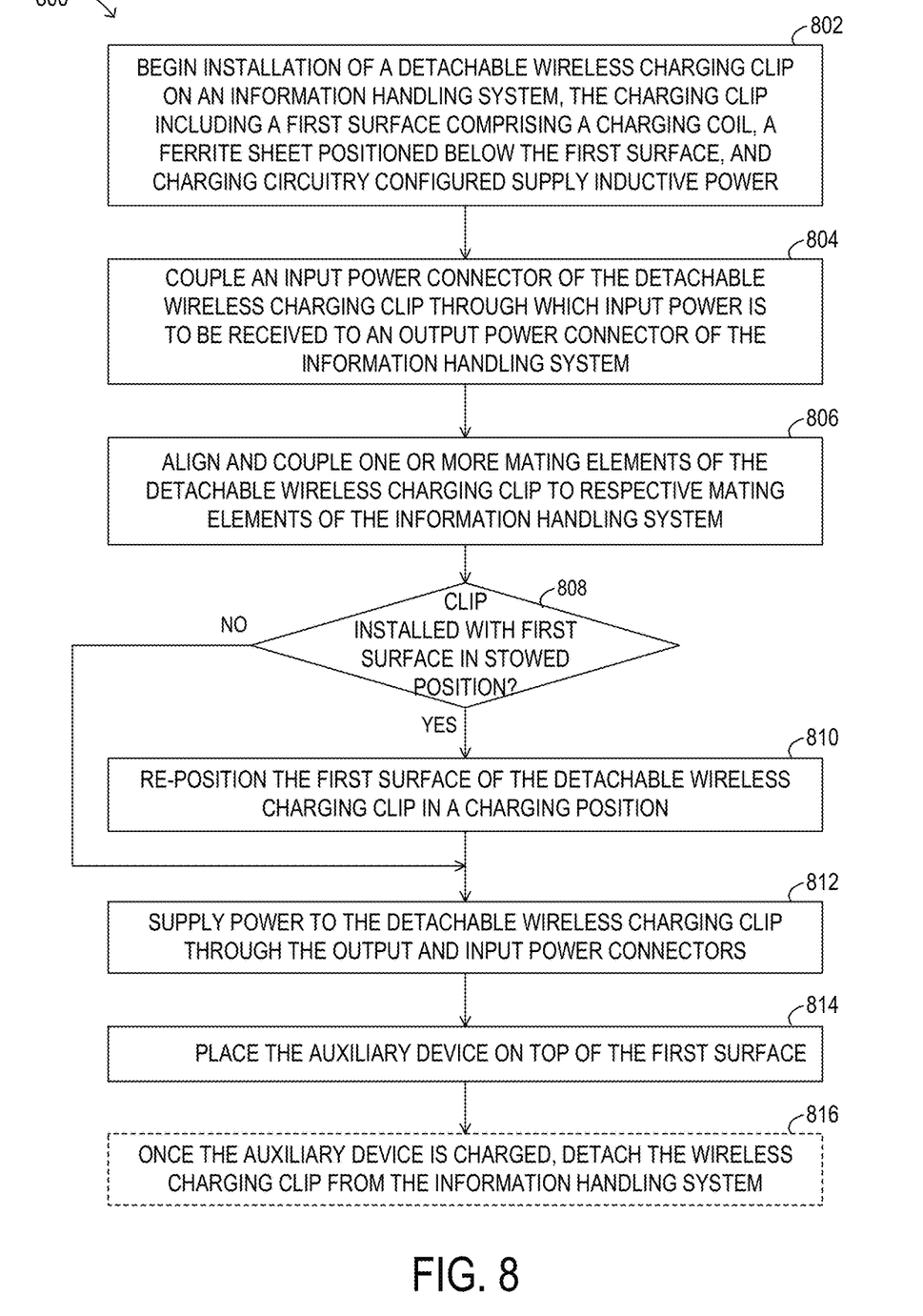
FIG. 8 is flow diagram illustrating selected elements of a method for charging an auxiliary device using a detachable wireless charging clip of an information handling system, according to some embodiments.

Referring now to FIG. 8, selected elements of an embodiment of method 800 for charging an auxiliary device using a detachable wireless charging clip of an information handling system, as described herein, are depicted in flowchart form. In certain embodiments, method 800 may be performed using a detachable wireless charging clip such as charging clips 175, 220, or 620 installed in an information handling system such as information handling system 100 or portable computing device 210, as described herein, to charge an auxiliary device such as auxiliary device 176 or 230. Method 800, or particular elements thereof, may be performed repeatedly or continuously to charge various auxiliary devices while the detachable wireless charging clip is installed on the information handling system. It is noted that certain operations described in method 800 may be optional or may be rearranged in different embodiments.

Method 800 may begin, at 802, with beginning installation of a detachable wireless charging clip on an information handling system. The charging clip nay include a first surface comprising a charging coil, a ferrite sheet positioned below the first surface, and charging circuitry configured supply inductive power for charging an auxiliary device, as described herein.

At 804, method 800 may include coupling an input power connector of the detachable wireless charging clip through which input power is to be received to a corresponding output power connector of the information handling system. At 806, the method may include aligning and coupling one or more mating elements of the detachable wireless charging clip to respective mating elements of the information handling system. In some embodiments, this may include coupling multiple magnetic mating elements on each of one or more surfaces of the charging clip, including the first surface, to respective magnetic mating elements on one or more portions of the housing of the information handling system, as described herein. In some embodiments, this may include aligning one or more physical alignment tabs on the charging clip with respective recess elements on the information handling system, or vice versa, and inserting the physical alignment tabs into the respective recess elements.

At 808, if the detachable wireless charging clip has been installed such that the first surface is in a stowed position, method 800 may continue to 810. Otherwise, method 800 may proceed to 812. At 810, the method may include re-positioning the first surface of the detachable wireless charging clip in a charging position. For example, the first surface may positioned underneath the information handling system with the charging coil side facing down when the charging clip is in the stowed position and may be rotated about a hinge such that it extends outward and away from the information handling system with the charging coil side facing up when the changing slip is in the charging position.

At 812, method 800 may include supplying power to the detachable wireless charging clip through the output power connector of the information handling system and the input power connector of the detachable wireless charging clip.

At 814, the method may include placing the auxiliary device on top of the first surface to be charged via resonant inductive coupling.

In at least some embodiments, method 800 may also include, once the auxiliary device has been charged, detaching the wireless charging clip from the information handling system, as in 816.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A wireless charging clip for an information handling system, comprising:
    a first surface comprising a charging coil;
    a second surface;
    a ferrite sheet positioned below the first surface;
    one or more mating elements to be coupled to respective mating elements of the information handling system when the wireless charging clip is installed on the information handling system;
    charging circuitry configured supply inductive power to charge an auxiliary device when the auxiliary device is placed on top of the first surface; and
    a third surface comprising a connector through which input power is received from the information handling system when the wireless charging clip is installed on the information handling system,
    wherein when the wireless charging clip is in a charging state:
        the first surface extends outward and away from a bottom edge of a housing portion of the information handing system;
        the second surface extends inward from the bottom edge of the housing portion of the information handling system; and
        the third surface is positioned perpendicular to the first surface and to the second surface,
    wherein when the wireless charging clip is in a non-charging state:
        the second surface extends inward from the bottom edge of the housing portion of the information handling system; and
        the first surface extends inward from the bottom edge of the housing portion of the information handing system and is in contact with the second surface.

2. The wireless charging clip of claim 1, wherein:
    when the wireless charging clip is in the charging state:
        the second surface is in contact with a bottom side of the housing portion underneath the information handling system,
        wherein a first edge of the third surface is coupled to a first edge of the first surface and a second edge of the third surface parallel to the first edge of the third surface is coupled to a first edge of the second surface parallel to the first edge of the first surface.

3. The wireless charging clip of claim 2, wherein when the wireless charging clip is in the non-charging state:
    the second surface is in contact with the bottom side of the housing portion underneath the information handling system; and
    the first surface is positioned below the second surface.

4. The wireless charging clip of claim 1, wherein the one or more mating elements include one or more magnets that, when magnetically coupled to respective magnets on the information handling system, cause the wireless charging clip to be installed on the information handling system in a predetermined position with respect to the information handling system.

5. The wireless charging clip of claim 1, wherein the one or more mating elements include one or more magnets that, when magnetically coupled to respective magnets on the information handling system, hold the wireless charging clip in place when installed on the information handling system.

6. The wireless charging clip of claim 1, wherein the one or more mating elements include one or more physical alignment tabs to be inserted in respective recess elements of the information handling system when the wireless charging clip is installed on the information handling system.

7. The wireless charging clip of claim 1, wherein the charging coil is screen-printed on the first surface.

8. The wireless charging clip of claim 1, wherein the charging coil comprises multiple graphene layers.

9. The wireless charging clip of claim 1, wherein the auxiliary device comprises a personal mobile device.

10. A system, comprising:
    a computing device; and
    a wireless charging clip for the computing device, comprising:
        a first surface comprising a charging coil;
        a second surface;
        a ferrite sheet positioned below the first surface;
        one or more mating elements to be coupled to respective mating elements of the computing device when the wireless charging clip is installed on the computing device;
        charging circuitry configured supply inductive power to charge an auxiliary device when the auxiliary device is placed on top of the first surface; and
        a third surface comprising a connector through which input power is received from the computing device when the wireless charging clip is installed on the computing device,
    wherein when the wireless charging clip is in a charging state:
        the first surface extends outward and away from a bottom edge of a housing portion of the information handing system;
        the second surface extends inward from the bottom edge of the housing portion of the information handling system; and
        the third surface is positioned perpendicular to the first surface and to the second surface,
    wherein when the wireless charging clip is in a non-charging state:
        the second surface extends inward from the bottom edge of the housing portion of the information handling system; and
        the first surface extends inward from the bottom edge of the housing portion of the information handing system and is in contact with the second surface.

11. The system of claim 10, wherein:
    when the wireless charging clip is in the charging state:
        the second surface is in contact with a bottom side of the housing portion underneath the computing device,
        wherein a first edge of the third surface is coupled to a first edge of the first surface and a second edge of the third surface parallel to the first edge of the third surface is coupled to a first edge of the second surface parallel to the first edge of the first surface.

12. The system of claim 10,
wherein the one or more mating elements include one or more magnets that, when magnetically coupled to respective magnets on the computing device, hold the wireless charging clip in a predetermined position with respect to the computing device when the wireless charging clip is installed on the computing device.

13. The system of claim 10, wherein the charging coil comprises multiple graphene layers.

14. A method for charging an auxiliary device, comprising:
- installing a detachable wireless charging clip on an information handling system, the detachable wireless charging clip comprising:
  - a first surface comprising a charging coil,
  - a second surface,
  - a ferrite sheet positioned below the first surface,
  - charging circuitry configured supply inductive power to charge the auxiliary device when the auxiliary device is placed on top of the first surface,
  - a third surface comprising a connector through which input power is received from the information handling system when the wireless charging clip is installed on the information handling system,
  - wherein the installing includes coupling the connector of the detachable wireless charging clip to an output power connector of the information handling system;
- supplying power to the detachable wireless charging clip through the output power connector of the information handling system and the input power connector of the detachable wireless charging clip; and
- placing the auxiliary device on top of the first surface,
- wherein when the wireless charging clip is in a charging state:
  - the first surface extends outward and away from a bottom edge of a housing portion of the information handing system;
  - the second surface extends inward from the bottom edge of the housing portion of the information handling system; and
  - the third surface is positioned perpendicular to the first surface and to the second surface,
- wherein when the wireless charging clip is in a non-charging state:
  - the second surface extends inward from the bottom edge of the housing portion of the information handling system; and
  - the first surface extends inward from the bottom edge of the housing portion of the information handling system and is in contact with the second surface.

15. The method of claim 14, wherein the installing further comprises:
- aligning one or more mating elements of the detachable wireless charging clip to respective mating elements of the information handling system; and
- coupling the one or more mating elements of the detachable wireless charging clip to the respective mating elements of the information handling system.

16. The method of claim 14, wherein:
the installing comprises positioning the first surface of the detachable wireless charging clip in a stowed position with respect to the information handling system; and
the method further comprises, prior to placing the auxiliary device on top of the first surface, re-positioning the first surface of the detachable wireless charging clip in a charging position with respect to the information handling system.

17. The method of claim 14, further comprising, subsequent to placing the auxiliary device on top of the first surface:
- determining that the auxiliary device has been charged; and
- detaching the detachable wireless charging clip from the information handling system.

\* \* \* \* \*